Aug. 19, 1969 D. M. FRENCH 3,462,639

DIGITAL MARKER GENERATOR FOR CATHODE RAY TUBE

Filed Dec. 19, 1966 2 Sheets-Sheet 1

INVENTOR
DONALD M. FRENCH
BY [signature]
[signature]
ATTORNEYS

DIGITAL MARKER GENERATOR FOR CATHODE RAY TUBE

Filed Dec. 19, 1966 2 Sheets-Sheet 2

INVENTOR
DONALD M. FRENCH
BY [signature]
[signature]
ATTORNEYS

United States Patent Office 3,462,639

Patented Aug. 19, 1969

3,462,639
DIGITAL MARKER GENERATOR FOR CATHODE RAY TUBE

Donald M. French, Torrance, Calif., assignor to the United States of America as represented by the Secretary of the Navy Filed Dec. 19, 1966, Ser. No. 603,064
Int. Cl. H01j 29/70
U.S. Cl. 315—19 8 Claims

ABSTRACT OF THE DISCLOSURE

A circuit is provided for enabling a spot, line, or other marker to be moved to any desired location on the face of a cathode ray tube. The movement of the marker is controlled by a manually adjustable potentiometer. A sweep voltage is derived from a repetitive accumulation of pulses. A digital marker generator is inherently operative to produce a desired modulation of the cathode ray tube at a time and position during the sweep which is digitally determined from the same pulse source as the sweep voltage, causing the marker to be displayed in its proper position.

The invention described herein may be manufactured and used by or for the Goverenment of the United States of America for governmental purposes without the payment of any royalties thereon or therefor.

This invention is related to cathode ray tube visual displays employed with equipments having a clock or similar type of pulse source available to be used for the time base of the sweep circuits controlling the deflection of a cathode ray tube. More particularly, the invention facilitates generating a spot, cursor lines, or combinations of such visual indications in order to locate any desired position on the face of the cathode ray tube.

In accordance with the concept of the present invention, any desired position may be located visually on the face of the cathode ray tube and ascertained to the nearest digit relative to the resolution of the cathode ray tube equipment. The concept of the present invention enables the operator to adjust a simple rotatable potentiometer knob and thereby move the internally generated spot, line, or other marker to the desired position on the face of the cathode ray tube; one or more such potentiometers may be provided in accordance with the number of degrees of movement it is wished to provide for the marker; a digital visual display having a quantitative value commensurate with and responsive to the setting of each such potentiometer then affords reading of the location of such marker in a greatly facilitated, more accurate, and convenient manner than comparable prior art arrangements.

In prior art systems for generating markers for visual displays on the face of cathode ray tubes, a number of different concepts have been employed. One such prior art type of system employed sawtooth waves of different periods and the relative phase relationship of the sawtooth waves determined the position of an appropriate marker on the face of the cathode ray tube.

Some other types of prior art systems employed a variable delay means which was related to the beginning of the deflection sweep of the cathode ray tube. In certain prior art equipments such delay means comprised a phantastron circuit acuated at an appropriate time to provide a calculated delay for gating a visual marker on the fece of the cathode ray tube.

One disadvantage of such prior art circuits was the fact that delay means such as the phantastron circuit were subject to some lack of stability, and repeatability due to drift and environmental causes.

Similarly, the use of sawtooth waves necessarily involved the use of sawtooth wave generators which were subject to instability, drift, and lack of repeatability. It will also be apparent to those skilled in the art that the employment of phase comparison concepts necessarily involved certain disadvantages which are preferably avoided.

Moreover, in any such system it is highly desirable to have a quick, convenient, and accurate means of digitally reading out the position of a location or marker on the face of the cathode ray tube; this feature was absent or only partially realized in many of the prior art systems.

Accordingly, it is an object of the present invention to provide a digital marker generator for a cathode ray tube which employs a highly accurate pulse count of a stable pulse source for locating a visual marker on the face of a cathode ray tube.

Another primary object of the present invention is to provide such a digital marker generator which affords a convenient and highly precise, selectively variable means of positioning a visual marker on the face of the cathode ray tube.

An equally important object of the present invention is to provide such a digital marker generator for a cathode ray tube wherein the same pulse source employed for developing a sweep deflection signal is also used for generating a visual marker on the face of the cathode ray tube.

A further object of the present invention is to provide a digital marker generator of the type described wherein the pulses employed for generating a desirably positioned marker are instantaneously and digitally presented in visual form.

Yet another important object of the present invention is to provide a digital marker generator for a cathode ray tube which periodically accumulates a determinable number of pulses for positioning a visual marker which is caused to be displayed by the cathode ray tube during the interval between normal sweep periods of the deflection circuits of the tube.

In its fundamental form the digital marker generator of the present invention may comprise a pulse source and means for periodically accumulating a determinable number of pulses from the pulse source. Means are provided for converting the accumulated pulses to an output potential having an amplitude commensurate with the number of such accumulated pulses. The resultant output potential of the converter means is fed as one input to a comparator means. A second input to the comparator is derived from a selectively variable potential source which may consist of a high resolution potentiometer connected to a highly stable potential source of electrical energy. When the amplitude of the signal representative of the number of accumulated pulses reaches the selectively adjusted amplitude of the variable potential source, the comparator means is caused to produce an appropriate output signal. Appropriate gating circuitry is arranged to be responsive to the output signal of the comparator for gating the accumulated output potential to the deflection controls of the cathode ray tube; means for modulating the electron beam of the cathode ray tube is arranged to be operative coincidentally with the gating of the accumulated output potential so as to produce a visual indication on the face of the cathode ray tube at a location commensurate with the selected amplitude of the variable potential source.

In a preferred embodiment of the present invention a variable potential source such as a potentiometer may be adjustable in each of two rotatable directions representative of each of two directions in one degree of freedom such as horizontal coordinates, for instance; a second variable potential source, similarly rotatably adjustable in two directions, may be representative of the directions of a second degree of freedom such as the vertical coordinates which are correlated to the previously mentioned horizontal coordinates. In this manner, two rotatable control means may be employed to ascertain any location on the face of the cathode ray tube and provide an appropriate marker, the coordinate position of which is indicated by the visual digital display representative of the number of pulses counted in each of two degrees of deflection to position such marker.

These and other advantages, features and objects of the present invention will be more readily understood from the following description of an embodiment of the present invention together with the accompanying drawings and the scope of the invention will be pointed out in the appended claims.

Figure 1:
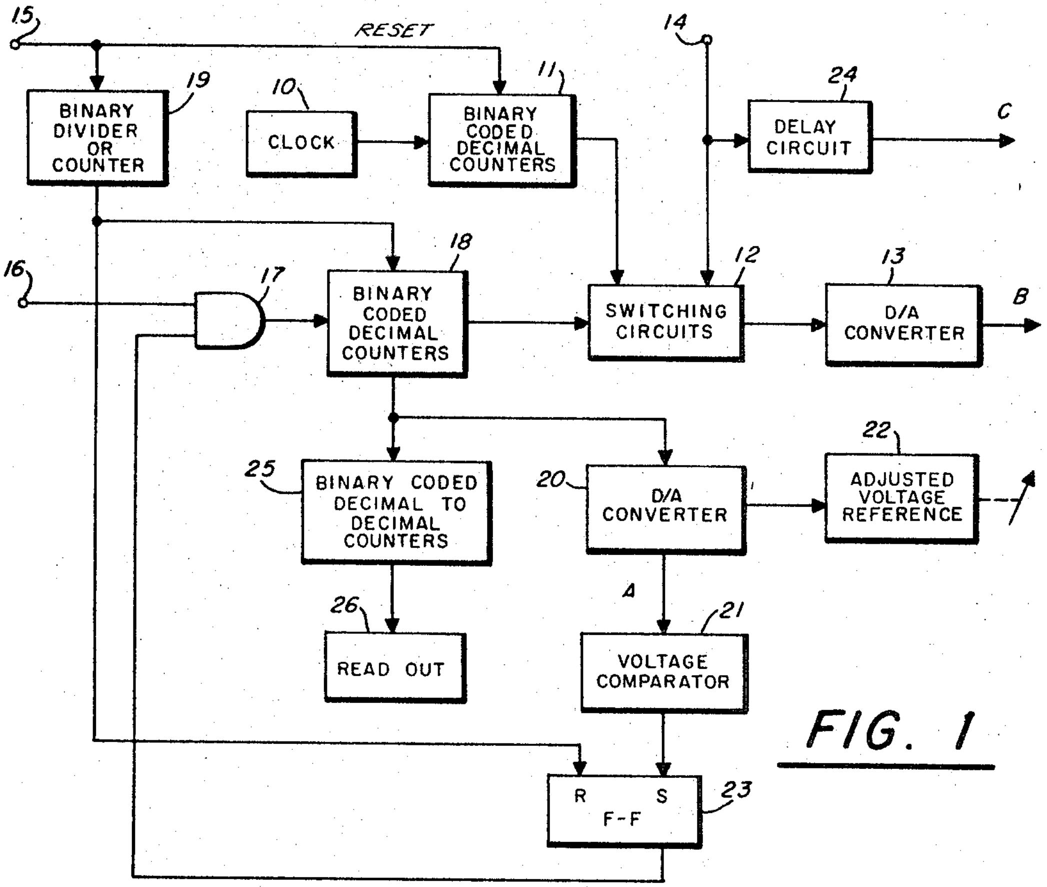
FIG. 1 is a schematic block diagram of an embodiment of the present invention.

The block diagram of FIG. 1 shows a type of sweep generating circuit which can be employed together with the present invention to develop appropriate deflection signals for positioning the electron beam of a cathode ray tube. If convenient, it is preferable in many instances to employ a source of fixed frequency pulses such as the clock 10 to provide the input to a counter such as the binary coded decimal counters shown at 11. The binary coded decimal counters 11 produce output signals which are connected to switching means 12; the switching means may take the form of appropriately arranged and connected logic circuitry 12 generating signals connected to a digital-to-analog converter 13. The digital count which is switched by the switching circuit 12 from the binary coded decimal counter 11 causes the digital-to-analog converter 13 to develop an analog output signal commensurate with the digital count fed into it.

The analog signal output of the digital-to-analog converter 13, in turn, provides a sweep voltage over a time base and may be employed as the deflection signal to appropriately position the electron beam of a cathode ray tube. Such a signal is actually in the form of a step, staircase, or sawtooth voltage but is comprised of such a large number of graduated, discrete increments that it is virtually a smooth, uniformly increasing voltage, the amplitude of which is commensurate with the instantaneous count of the clock pulses received by the binary coded decimal counter 11 from the clock or other suitable pulse source 10. The input terminal 14 is connected as an input to the switching circuits 12 and receives a pulse at the end of each repetitive sweep; its operation will be explained more fully hereinafter.

An appropriate reset pulse is fed to an input terminal 15 which resets the binary coded decimal counter 11 to begin the development of a new sweep voltage in the manner prevously described. Thus, the sweep voltage is developed periodically and repetitively in accordance with the frequency of the reset pulses impressed upon the input terminal 15 and connected to the binary coded decimal counters 11.

The clock 10 or some suitable source such as a multiple of the clock frequency pulses is arranged to impress an input signal on the input terminal 16 which signal is fed to an AND gate 17 providing an input to binary coded decimal counters 18. The binary coded decimal counters 18 receives pulse inputs from a binary divider or counter 19; these pulses are of the same frequency or a frequency harmonically related to the pulses of the clock source 10.

The outputs of the binary coded decimal counters are connected to a digital-to-analog converter 20 which develops an output signal having an amplitude dependent on the instantaneous count received and recorded in the binary coded decimal counters 18. The digital-to-analog converter 20 provides one of the two inputs to a voltage comparator 21. The other input to the voltage comparator 21 is generated by an adjustable voltage reference 22 which may comprise a high resolution potentiometer connected to develop a selected portion of a stable voltage source.

The voltage comparator 21 compares the amplitude of the adjustable voltage reference developed by element 22 to the analog voltage developed by the digital-to-analog converter 20. When these two inputs are equal, an output signal is produced by the voltage comparator 21 which is fed to a switch means such as the flip-flop 23.

Accordingly, the voltage comparator 21 produces an output signal which is indicative of the fact that the amplitude of the adjustable voltage reference 22 has been matched by the amplitude of an analog signal generated by the digital-to-analog converter 20 which amplitude is indicative of the number of pulse counts received and recorded in the binary coded decimal counter 18. It will be apparent that as a result, the number of pulses or counts which are required to cause the voltage comparator 21 to produce an output signal can be selectively varied by the appropriate adjustment of the adjustable voltage reference 22.

The switch means 23 in the form of a flip-flop produces an output which disables the AND gate 17 and accordingly stops further pulse counts from being received and recorded in the binary coded decimal counter 18. Thus, the arrested or stopped pulse count recorded in the binary coded decimal counter 18 as a result of the input AND gate 17 being disabled, is impressed upon the switching circuits 12 and connected as the input to the digital-to-analog converter 13.

At the end of each repetitive sweep, a pulse is fed to the input terminal 14, as was previously mentioned, which pulse actuates a delay circuit 24. The delay circuit 24 is connected to the modulation circuits which control the degree of modulation of the electron beam within the cathode ray tube. An appropriate delay is impressed upon such modulation so that a predeterminable time after the sweep voltage has been completed, the arrested or partial binary count stored in the binary coded decimal counters 18 is in effect caused to position the electron beam with the instantaneous, momentary modulation indicating such position by a brightened portion of the face of the cathode ray tube.

Thus, a line, marker, spot or other indication can be made to appear on the screen of a cathode ray tube in accordance with the setting of the reference voltage as selectively varied by adjustment of element 22. It will be appreciated by those skilled in the art that the block diagram of FIG. 1 represents only one of several degrees of deflection which may be incorporated in a cathode ray tube. For instance, the block diagram of FIG. 1 may control only the vertical, horizontal or radial deflection of a line type marker for visual indication on the face of a cathode ray tube.

Those knowledgeable in the art will recognize that two such conceptually identical circuits may be employed, one being operative to control the horizontal deflection circuits relative to a positionable marker, spot, etc., while the other of the two circuits is operative to control the vertical position.

The program of the binary coded decimal counters 18 provides an output connected to a binary coded decimal-to decimal converter 25 which, in turn, provides the input to a plurality of nixie tubes or other suitable visual display means as indicated at 26; accordingly, the decimal count of pulses as received, recorded, and arrested in the binary coded decimal counter 18 may be read by an operator. The response to adjustment of the adjustable voltage reference 22 is immediately presented by the visual indicators 26 within the fine degree of the high frequency pulse rate which provides the pulse inputs to the system. As will be apparent to those knowledgeable in the art, if a suitably high resolution potentiometer is employed as the adjustable voltage reference means 22, the resolution of the system is of a desirably high order. Additionally, the stability, repeatability and freedom from drift of the system will be apparent in accordance with the concept by which a highly stable pulse source, such as a clock 10, assures freedom from many of the disadvantages which were virtually inherent in prior art systems.

Moreover, if the pulse frequency provided by the pulse source, such as a clock 10, should vary, the sweep voltage will vary proportionately; however, the relative position of a spot, marker, or other visual indication will remain in its proper relationship and proportionality with respect to the sweep voltage. Thus, such spot, marker, or other visual indicator as developed by the concept of the present invention retains its relative position in respect of other data and information visually displayed on the face of the cathode ray tube, since both are derived from the same basic source, i.e., an appropriate pulse source such as the clock 10.

Figure 2:
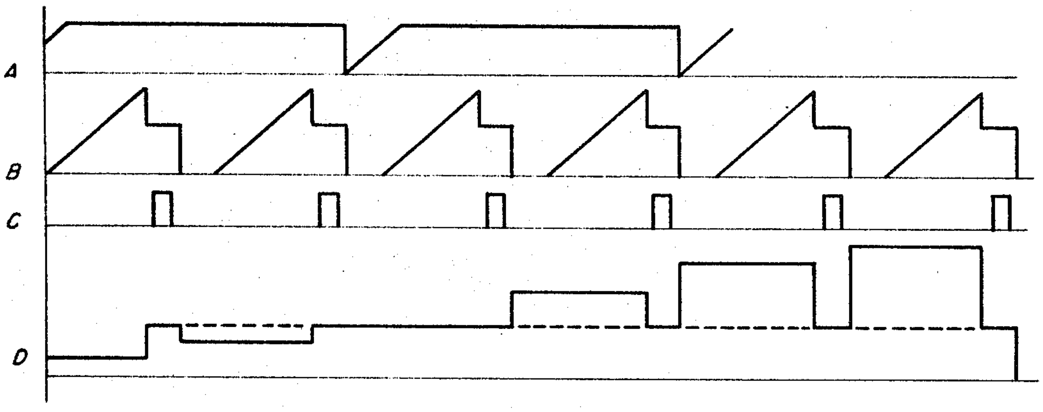
FIG. 2 is a graphic illustration of several of the waveforms developed in accordance with the concept of the present invention in the embodiments illustrated in FIGS. 1 and 3.

FIG. 2 shows several of the waveforms which may be developed in the operation of an embodiment of the present invention such as that shown in FIG. 1. The waveform A of FIG. 2 shows the amplitude of voltage developed by the digital-to-analog converter 20 as a result of the accumulated count in the binary coded decimal countter 18 being arrested or stopped. The voltage comparator 21 receives the analog potential output of the digital-to-analog converter 22 and when its amplitude becomes equal to the adjusted amplitude of voltage reference 22, voltage comparator 21 produces an output and actuates the flip-flop 23 to disable the AND gate 17 so that the accumulated count in the binary coded decimal counter 18 remains the same.

Waveform B shows the waveform which is developed at the output of the digital-to-analog converter 13. This is the sweep voltage for the faster of two sweeps which may, for example, be the horizontal sweep signal which actuates the deflection circuits of a cathode ray tube. It will be noticed that the sweep signal developed actually appears as a staircase voltage which really comprises a series of accumulated pulses. It will be appreciated by those skilled in the art that the illustration of waveform B in FIG. 2 is greatly exaggerated for purposes of clarity and explanation; such pulses are so minute and of such greater frequency in actual operation, that the staircase voltage as developed is virtually a smooth, gradually increasing voltage. At the point Q it will be seen that the voltage decreases in amplitude to what may be called the marker control or spot voltage. At this point, the switching circuits 12 are actuated to switch the arrested binary count received and recorded in binary decimal counter 18. The counter 18 is switched into the digital-to-analog converter 13 to provide a proportionate output voltage at terminal B as indicated in the block diagram of FIG. 1. This voltage, in turn, is gated by a gate signal substantially of the type illustrated by waveform C of FIG. 2. The gate signal is developed responsive to a pulse received at terminal 14 at the end of each sweep of the associated deflection circuit and undergoes a certain amount of predetermined, desirable delay effected by the delay circuit 24. The delayed gating signal controls the scope modulation which causes the bright spot, marker line, or other visual indication to appear on the face of the cathode ray tube.

A slower sweep voltage is indicated by waveform D of FIG. 2 and such slower sweep may, for instance, be that developed for purposes of vertical deflection in a typical cathode ray tube operation. This signal, it will be seen, is of gradually increasing character in the manner of a stretched out sawtooth waveform. It will be noted, however, that an adjustable spot voltage or deflection control voltage for the second degree of deflection is developed substantially in synchronism with the delayed gate signal provided by waveform C.

Figure 3:
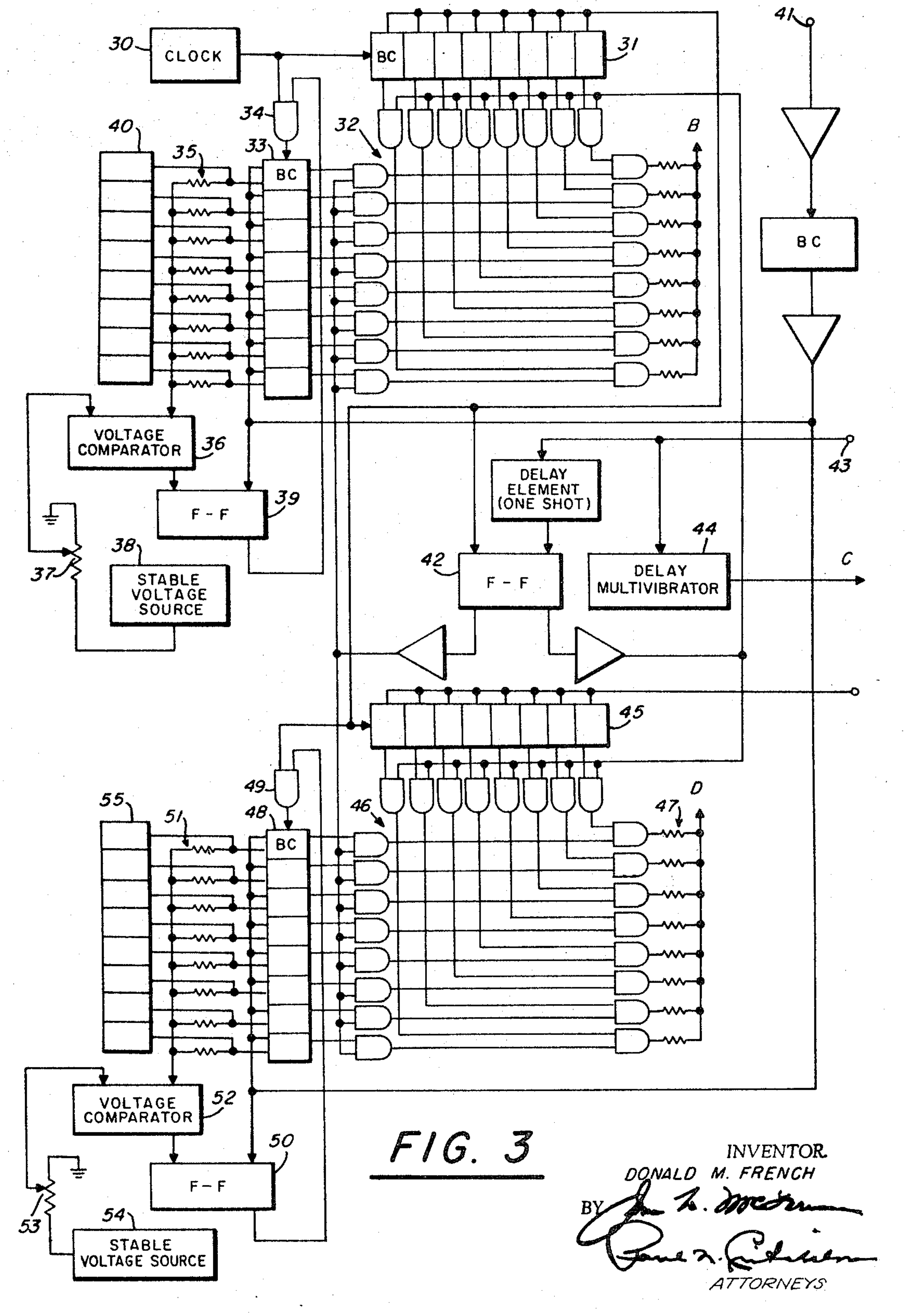
FIG. 3 is a more detailed schematic wiring diagram of an embodiment of the present invention.

A schematic wiring diagram illustrating in more detail the arrangements and connections of a system embodying the concept of the present invention and providing adjustment for both horizontal and vertical sweep positioning for a spot, line marker, or other visual indicator is shown in FIG. 3. The system of FIG. 3, accordingly, develops a voltage of the type indicated by waveform D of FIG. 2, which latter waveform is not developed in the system illustrated by block diagram of FIG. 1 inasmuch as the system of FIG. 1 develops only one of two sweep voltages and its associated marker positioning signals.

In FIG. 3 there is shown a clock source 30 which provides a substantially constant and stable frequency source of pulses of a desirable character and amplitude. The pulse outputs of clock 30 are fed by appropriate connection to a set of binary coded decimal counters 31 which in the instance of the system illustrated in FIG. 3 are related to the vertical deflection circuits of the cathode ray tube or other suitable visual display means.

The outputs of the binary coded decimal counters 31 are fed through an appropriate arrangement of logic circuitry comprising a plurality of NAND gates as illustrated generally at 32. The outputs of the NAND gates 32 are impressed upon parallel connected resistors 33 which develop a vertical sweep voltage at terminal B for connection to the vertical sweep deflection circuits of a cathode ray tube.

The output of the clock source 30 is connected to a second plurality of binary coded decimal counters 33 through a NAND gate 34 which similarly develop outputs fed to parallel connected resistors as indicated generally at 35. The parallel connected output resistors 35 of the binary coded decimal counters 33 develop a potential which is fed to voltage comparator 36 for comparison with a source of selectively variable potential as generated by the variable resistor or potentiometer 37 which may, for instance, take the form of a helically wound precision potentiometer connected to a stable voltage source 38.

The voltage comparator 36 compares the voltage output of the binary coded decimal counter 33 with the selectively adjusted voltage derived from the potentiometer 37 and when the two are equal, provides an output signal to the flip-flop 39 which, in turn, is connected to disable the binary counter 33 from the further acceptance of additional binary pulse counts.

The instantaneous analog voltage developed by the resistors 35 as a result of the arrested binary count in the binary coded decimal counter 33 is also impressed on an array of suitable visual indicators 40 which may take the form of the so-called "nixie" tubes. These indicators visually present the numerical quantity of counts which have been instantaneously received and recorded by the binary coded decimal counter 33 and, therefore, are a continuous and constant indicator of the selectively adjusted voltage developed by reason of the variation of the potentiometer 37. Accordingly, the indicated quantitative pulse count is also an indication of the location of the spot, line marker, or other visual indicator caused to appear on the face of the cathode ray tube relative to the full sweep or deflection of the cathode ray tube.

A reset pulse developed by a frequency divider or other suitable means from the pulses of clock 30 is received at the terminal 41, appropriately amplified. The reset pulse also operates to reset the binary coded decimal counters 31 and to actuate a flip-flop 42 which switches the logic circuitry and switching arrangement 32 to read out the adjusted or arrested binary count as developed in the binary coded decimal counter 33. The resultant analog potential or signal is fed to the vertical sweep deflection means of the cathode ray tube from the terminal marked B.

At substantially the same time, a delay multivibrator 44 is actuated by reason of receiving a signal substantially coincident with the reset pulse at the end of each vertical sweep received at terminal 41. The output of the delay multivibrator 44 controls the modulation of the electron beam within the cathode ray tube to make a spot, line marker, or other visual indicator appear on the face of the cathode ray tube.

In a similar manner to that described above, the lower portion of the schematic wiring diagram of FIG. 3 operates in association with the horizontal sweep voltage developed for control of the electron beam within the cathode ray tube. The clock 30 provides pulses at a constant frequency or rate as the input to the binary coded decimal counters 45 which are arranged to provide outputs in accordance with the number of pulses received. The plurality of outputs are connected to a switching means 46 in the form of a logical array of NAND gates 46. The outputs of the NAND gates 46 are fed to parallel connected resistors 47 which perform the function of producing an analog voltage commensurate with the count developed in the binary coded decimal counters 45. The output developed by the parallel connected resistors 47 appears at terminal D as indicated in FIG. 3.

The clock 30 also provides the pulse input to an array of binary coded decimal counters 48 which are arranged and connected to the array of NAND gates 46. It should be noted that the binary coded decimal counters 48 receive inputs through NAND gate 49 which has a second input as received from an AC flip-flop 50. The binary coded decimal counters 48 develop an instantaneous count which produces an analog potential by reason of the parallel connection of a plurality of resistors 51. This potential is fed as one input to a voltage comparator 52. The other input to the voltage comparator 52 is provided by a potentiometer 53 which may be, for instance, in the form of a helically wound precision potentiometer such as that employed in the vertical sweep portion of the system shown in the upper part of FIG. 3.

In a similar manner, a stable voltage source 54 is provided and the potentiometer 53 is arranged so as to afford and facilitate the adjustable selection of an amplitude of potential as desired. When the amplitude of the adjusted selected voltage developed by the potentiometer 53 is equal to the analog potential developed by the parallel connected array of resistors 51, voltage comparator 52 produces an output actuating the AC flip-flop 50. The output of flip-flop 50 disables the NAND gate 49 so that the binary coded decimal counter 48 does not develop a further count of input pulses from the clock 30.

In a manner similar to that described in connection with the explanation of the upper portion of FIG. 3 showing the vertical sweep controls of the system, the parallel resistor array 51 is connected to an appropriate arrangement of visual indicators 55 which may take the form of the nixie tubes previously described generally at 40 in FIG. 3. Thus, the visual indicators 55 record the instantaneous count of pulses received and stored in the binary coded decimal counter 48. The visually indicated number of counts received and stored in the binary coded decimal counter 48 upon the disabling of the NAND gate 49 accordingly is an accurate, high resolution indication of the precise adjustment of the variable voltage source in the form of the potentiometer 53; the indicated pulse count is also a highly accurate indication of the location of a spot, line marker, or other visual indicator that may be caused to appear on the face of the cathode ray tube by reason of the selectively determined number of pulse counts stored in the binary coded decimal counter 48 associated with the horizontal sweep circuits of the cathode ray tube.

The analog voltage developed at the output terminal D is connected to the horizontal sweep deflection circuits of the cathode ray tube and upon actuation of the delay multivibrator 44, is operative to position the horizontal sweep or deflection of the electron beam within the cathode ray tube. Accordingly, the electron beam is deflected as desired in accordance with the adjustment of the variable potential source 53; upon the gated modulation of the electron beam, a spot or other appropriate visual indicator is caused to appear on the face of the cathode ray tube at the selected deflection position.

The waveform developed at the several terminal points in the apparatus illustrated by the schematic wiring diagram of FIG. 3 are identified by appropriate letter designations such as B and D which refer to the waveforms illustrated in FIG. 2. It should be noted that an appropriate frequency divider or counter may be employed in reset line to the binary coded decimal counters which are operative to receive, arrest and store the desired binary count in each of the vertical and horizontal sweep control circuits, so that sufficient time is afforded to read out the visual indicators as indicated at 55 and 40 in FIG. 3; for instance, or at 26 in FIG. 1.

It will be apparent to those skilled in the art that in its most desirable operation, embodiments of the concept of the present invention as illustrated in FIGS. 1 and 3 provide that when the staircase type of sweep signal is developed by reason of accumulated repetitive pulses generated by the clock or other appropriate source reaches its maximum amplitude, the switching circuits in the form of appropriately arranged logical NAND gates switch to the respective associated binary coded decimal counters, causing the respective output voltages to change to that selective voltage developed in accordance with the arrested or stored binary count in each of the respective controlled binary counter circuits. After a time delay, which allows the sweep circuits to position the spot marker, the intensity modulation for the spot or marker occurs and before the next cyclic operation the counters are reset and the sweep is switched so that sufficient time is afforded to reposition the sweep.

Because of its concept which inherently integrates the operation of the adjustable marker controls with the sweep developing circuits, the present invention is consequently not subject to drift, instability or lack of repeatability. On the contrary, the concept of the present invention is such that if the frequency of the source of basic pulses such as the clocks, as indicated in FIGS. 1 and 3, should vary or drift in frequency, there will be a commensurate and proportionate relative change in the counts recorded in the associated binary coded decimal counters employed for purposes of positioning the spot, line marker, or other visual indicator. As a consequence, the relative position of such visual indicator in the form of a spot, or line marker will be the same in both horizontal and vertical disposition relative to the full sweep in both of these axes.

Additionally, it should be appreciated that the present invention is not confined for use in an X–Y axis-type of presentation but may be advantageously employed with any deflection circuit such as a radial sweep, for example, and preferably one which operates from a source of pulses used to develop the basic sweep signals.

Obviously many modifications and variations of the present invention are possible in the light of the above teachings. It is therefore to be understood that within the scope of the appended claims the invention may be practiced otherwise than as specifically described.

What is claimed is:

1. A digital marker generator for a cathode ray tube comprising:

a pulse source;

means for cyclically initiating repetitive digital counts of pulses from said pulse source;

logic means for developing deflection signals for said cathode ray tube responsive to the instantaneous digital value of said repetitive digital counts of pulses;

means for periodically accumulating pulses from said pulse source in synchronism with said repetitive digital counts;

means for continuously converting accumulated pulses to an output potential varying in amplitude commensurate with the number of said accumulated pulses;

a selectively variable potential source;

comparator means for producing an output signal when the amplitude of said accumulated output potential reaches the selected amplitude of said variable potential source;

gating means responsive to the output signal of said comparator means for gating said accumulated output potential to the deflection controls of said cathode ray tube; and means for modulating the cathode ray of said tube coincident with said gating of said accumulated output potential, whereby to produce a visual indication having a location commensurate with said selected amplitude of said variable potential source.

2. A digital marker generator for a cathode ray tube as claimed in claim 1 and including a selectively variable potential source operatively responsive in each of two degrees of deflection for said cathode ray tube.

3. A digital marker generator for a cathode ray tube as claimed in claim 2 wherein a means for accumulating pulses is operatively responsive in each of said two degrees of deflection.

4. A digital marker generator for a cathode ray tube as claimed in claim 3 wherein both said means for accumulating pulses are connected to receive pulses from a common pulse source.

5. A digital marker generator for a cathode ray tube as claimed in claim 1 and including means for generating sweep deflection potentials from said pulse source.

6. A digital marker generator for a cathode ray tube as claimed in claim 1 wherein said means for periodically accumulating pulses comprises binary coded decimal counter means.

7. A digital marker generator for a cathode ray tube as claimed in claim 6 wherein the output signal of said comparator means actuates means to turn off said binary coded decimal counter means.

8. A digital marker generator for a cathode ray tube as claimed in claim 1 and including means for visually displaying digital count of said accumulated pulses.

References Cited

UNITED STATES PATENTS 2,753,451 7/1956 Cetrone ---------- 315—19 XR

RODNEY D. BENNETT, Jr., Primary Examiner

BRIAN L. RIBANDO, Assistant Examiner

U.S. Cl. X.R.

315—22